(12) United States Patent
Nagasawa

(10) Patent No.: US 10,173,622 B2
(45) Date of Patent: Jan. 8, 2019

(54) VEHICLE OCCUPANT PROTECTION APPARATUS

(71) Applicant: Fuji Jukogyo Kabushiki Kaisha, Tokyo (JP)

(72) Inventor: Isamu Nagasawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 11 days.

(21) Appl. No.: 15/390,103

(22) Filed: Dec. 23, 2016

(65) Prior Publication Data

US 2017/0274854 A1  Sep. 28, 2017

(30) Foreign Application Priority Data

Mar. 22, 2016 (JP) ................... 2016-056927

(51) Int. Cl.

| | |
|---|---|
| *B60R 21/01* | (2006.01) |
| *B60R 21/013* | (2006.01) |
| *B60R 21/0132* | (2006.01) |
| *B60R 21/0134* | (2006.01) |
| *B60R 22/46* | (2006.01) |

(Continued)

(52) U.S. Cl.
CPC ............ *B60R 21/01* (2013.01); *B60R 21/013* (2013.01); *B60R 21/0132* (2013.01); *B60R 21/0134* (2013.01); *B60R 21/0155* (2014.10); *B60R 21/01516* (2014.10); *B60R 21/01548* (2014.10); *B60R 22/4628* (2013.01); *B60R 22/48* (2013.01)

(58) Field of Classification Search
CPC ... B60R 21/01; B60R 21/013; B60R 21/0132; B60R 21/0134; B60R 22/4628; B60R 22/48

See application file for complete search history.

(56) References Cited

U.S. PATENT DOCUMENTS

| | | | | |
|---|---|---|---|---|
| 5,558,370 | A | * 9/1996 | Behr | ................... B60R 21/0132 242/374 |
| 2004/0212189 | A1* | 10/2004 | Kachu | ................... B60R 21/013 280/807 |

(Continued)

FOREIGN PATENT DOCUMENTS

| | | |
|---|---|---|
| JP | H10-167000 A | 6/1998 |
| JP | 2000-142321 A | 5/2000 |

(Continued)

OTHER PUBLICATIONS

Japanese Office Action dated Aug. 8, 2017 in Japanese Application No. 2016-056927 with an English translation thereof.

*Primary Examiner* — Aaron L Troost
(74) *Attorney, Agent, or Firm* — McGinn I.P. Law Group, PLLC.

(57) ABSTRACT

A vehicle occupant protection apparatus has a strap configured to extend across the front of a body of an occupant sitting on a seat of a vehicle, a pre-tensioner configured to retract the strap, a vehicle orientation sensor configured to detect either one of a change in the orientation of the vehicle and an operation for changing the orientation, and a controller configured to cause the pre-tensioner to start retracting the strap prior to a collision or when a collision occurs. After the retracting of the strap starts, the controller temporarily stops or eases the retracting of the strap in accordance with the change in the orientation of the vehicle.

17 Claims, 7 Drawing Sheets

(51) Int. Cl.
B60R 22/48 (2006.01)
B60R 21/015 (2006.01)

(56) References Cited

U.S. PATENT DOCUMENTS

2006/0065466 A1* 3/2006 Nishikaji .............. B60T 8/1755
180/268
2008/0306658 A1* 12/2008 Beisheim .............. B60R 21/013
701/46

FOREIGN PATENT DOCUMENTS

| JP | 2004-149051 A | 5/2004 |
| JP | 2011-152837 A | 8/2011 |

* cited by examiner

VEHICLE OCCUPANT PROTECTION APPARATUS

CROSS-REFERENCE TO RELATED APPLICATIONS

The present application claims priority from Japanese Patent Application No. 2016-056927 filed on Mar. 22, 2016, the entire contents of which are hereby incorporated by reference.

BACKGROUND

1. Technical Field

The present invention relates to occupant protection apparatuses in vehicles, such as automobiles.

2. Related Art

Japanese Unexamined Patent Application Publication Nos. H10-167000, 2000-142321, and 2011-152837 each disclose a pre-tension mechanism that retracts a strap, which extends across the front of an occupant sitting on a seat of an automobile, prior to or at the time of a collision. A pre-tension operation causes the back surface of the occupant sitting on the seat to be pressed against the backrest of the seat prior to the collision or at the time of the collision, so that when the occupant moves forward due to the collision, the posture of the occupant can be corrected. Thus, an impact load occurring at the time of the collision is readily applied to the occupant properly restrained by the strap, so that occupant protection performance can be achieved at the time of the collision.

However, in these existing pre-tension mechanisms, the pre-tension operation for retracting the strap commences prior to the collision or at the time of the collision, and the collision occurs in that state. Therefore, if the front of the vehicle sinks down due to, for example, a braking operation performed during the pre-tension operation, an area where the strap comes into contact with the occupant's body, such as the chest, receives a load occurring due to a change in the orientation of the vehicle in addition to a constraining pressure caused by the pre-tension operation for correcting the posture. In addition, when the collision subsequently occurs, an impact load occurring due to the collision is also applied. There is a high possibility that these three kinds of forces are added together and be applied to the contact area.

SUMMARY OF THE INVENTION

Accordingly, in a vehicle occupant protection apparatus, it is desirable to reduce the force acting on the area where the strap comes into contact with the occupant's body.

An aspect of the present invention provides a vehicle occupant protection apparatus including a strap configured to extend across a front of a body of an occupant sitting on a seat of a vehicle, a pre-tensioner configured to retract the strap, a vehicle orientation sensor configured to detect either one of a change in orientation of the vehicle and an operation for changing the orientation, and a controller configured to cause the pre-tensioner to start retracting the strap prior to a collision or when a collision occurs. After the retracting of the strap starts, the controller temporarily stops or eases the retracting of the strap in accordance with the change in the orientation of the vehicle.

In a case where sinking of a front of the vehicle is detected by the vehicle orientation sensor, the controller may temporarily stop or ease the retracting of the strap.

The vehicle occupant protection apparatus may further include a running condition sensor configured to detect a running condition of the vehicle. In a case where a possibility of a collision is present on a basis of the running condition detected by the running condition sensor, the controller may cause the pre-tensioner to start retracting the strap prior to the collision and cause the vehicle orientation sensor to start detecting the sinking of the front of the vehicle.

The controller may cause the pre-tensioner to temporarily stop or ease the retracting of the strap and subsequently retract the strap again.

The vehicle occupant protection apparatus may further include a running condition sensor configured to detect a running condition of the vehicle. In a case where a possibility of a collision is present on the basis of the running condition detected by the running condition sensor and the sinking of the front of the vehicle is not detected on the basis of the vehicle orientation sensor, the controller may cause the pre-tensioner to start retracting the strap. In a case where a possibility of a collision is present on the basis of the running condition detected by the running condition sensor and the sinking of the front of the vehicle is detected on the basis of the vehicle orientation sensor, the controller may cause the pre-tensioner to not start retracting the strap and subsequently cause the pre-tensioner to start retracting the strap after a delay.

The vehicle orientation sensor may be any one of a vehicle deceleration sensor, a seat sensor, a vehicle angular-speed sensor provided at either one of a front and a rear of the vehicle, and a belt sensor provided at the strap. Specifically, the vehicle deceleration sensor may be configured to detect either one of deceleration of the vehicle or the occupant and a decelerating operation.

The controller may feed the strap in control for temporarily easing the retracting of the strap.

DETAILED DESCRIPTION

Implementations of the present invention will be described below with reference to the drawings.

First Implementation

Figure 1:
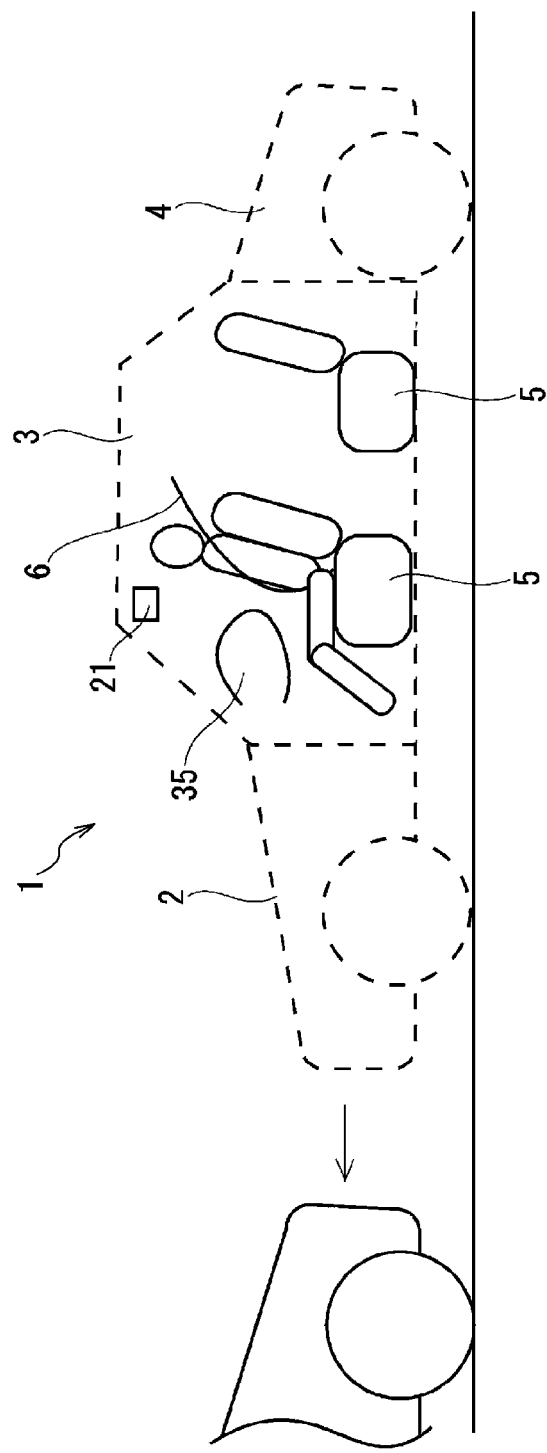
FIG. 1 illustrates an automobile according to a first implementation of the present invention.

FIG. 1 illustrates an automobile 1 according to a first implementation of the present invention. The automobile 1 is an example of a vehicle. In FIG. 1, another automobile 1 running ahead of the automobile 1 is also illustrated.

The automobile 1 in FIG. 1 has a vehicle body constituted of a front compartment 2, an occupant compartment 3, and a rear compartment 4. Power units, such as an engine and an electric motor, are disposed in the front compartment 2. A luggage space is provided in the rear compartment 4. Seats 5 on which on-board occupants sit are provided in the occupant compartment 3. Furthermore, in the occupant compartment 3, operable members, such as a gas pedal, a brake pedal, and a steering wheel, are provided in front of the driver seat 5. The automobile 1 moves forward, stops, and turns left and right based on operations performed by the driver.

Figure 2A:
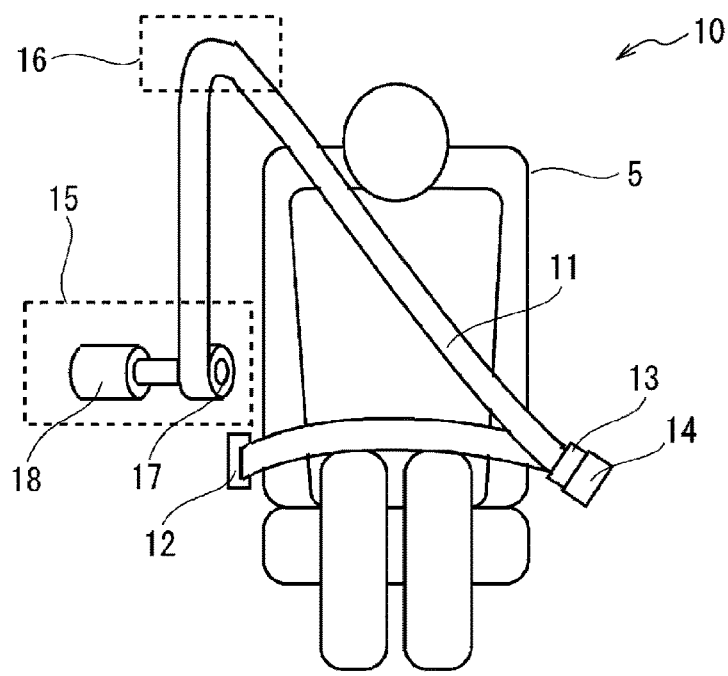
FIGS. 2A and 2B illustrate an example of a vehicle occupant protection apparatus provided in a vehicle body in FIG. 1.
Figure 2B:
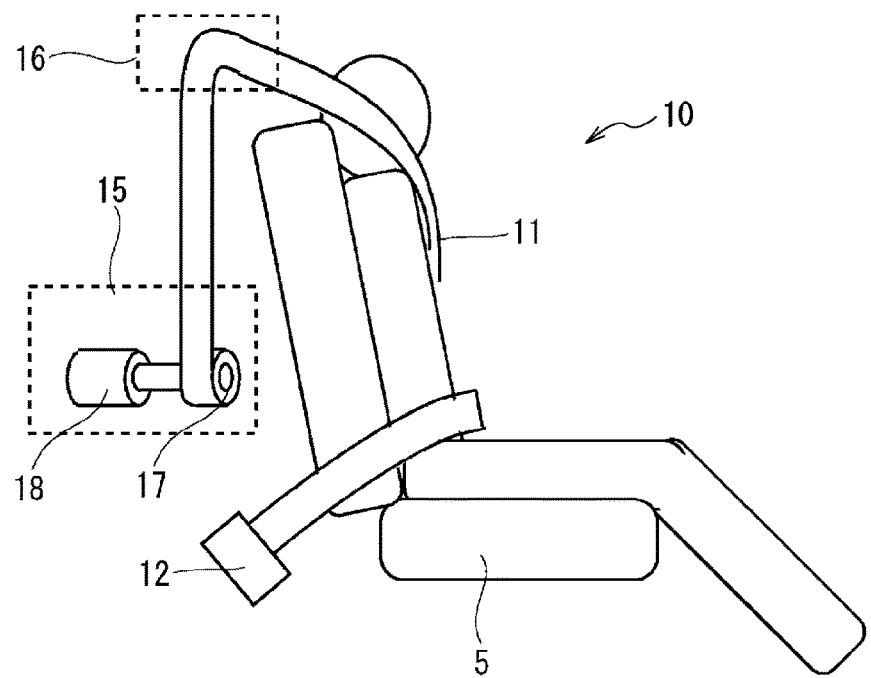

FIGS. 2A and 2B illustrate an example of a vehicle occupant protection apparatus provided in the vehicle body in FIG. 1.

In FIGS. 2A and 2B, a three-point seatbelt device 10 is illustrated. The seatbelt device 10 has a strap 11, an anchor 12, a tongue plate 13, a buckle 14, a retractor device 15, and a holder 16.

The strap 11 is a belt extending across the front of the body of an occupant sitting on each seat 5.

The anchor 12 secures the leading end of the strap 11 at an outer position of the seat surface of the seat 5.

The strap 11 is inserted through the tongue plate 13.

The buckle 14 is secured at an inner position of the seat surface of the seat 5. The tongue plate 13 is attached to the buckle 14 in a detachable manner.

The retractor device 15 has a reel 17 for retracting the strap 11, a motor 18 that rotationally drives the reel 17 in forward and reverse directions with a freely-chosen torque, and a gas generator (not illustrated) that causes the reel 17 to quickly rotate in the retracting direction. The motor 18 and the gas generator may function as a pre-tensioner that retracts the strap 11 prior to a collision.

The retractor device 15 is provided at an outer lower position of the seat 5, such as below the B pillar.

The holder 16 is provided at an outer upper position of the seat 5, such as above the B pillar. The strap 11 is inserted through the holder 16.

For example, the occupant sitting on the seat 5 pulls the tongue plate 13 to pull out the strap 11 from the retractor device 15, and then fastens the tongue plate 13 to the buckle 14. Thus, the strap 11 extends from the holder 16 toward the buckle 14 and further extends from the buckle 14 toward the anchor 12, so that the strap 11 extends across the front of the waist and chest of the occupant sitting on the seat 5.

FIGS. 3A to 3D illustrate an example of an occupant protection operation performed by a generic occupant protection apparatus.

Figure 3A:
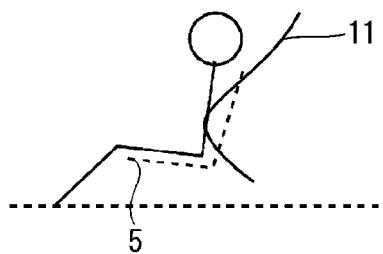
FIGS. 3A to 3D illustrate an example of an occupant protection operation performed by a generic occupant protection apparatus.

Prior to a collision, the strap 11 of the seatbelt device 10 extends across the front of the occupant sitting on the seat 5, as illustrated in FIG. 3A. At this point, the strap 11 may be loose and does not have to press and restrain the occupant's body toward the seat 5.

Figure 3B:
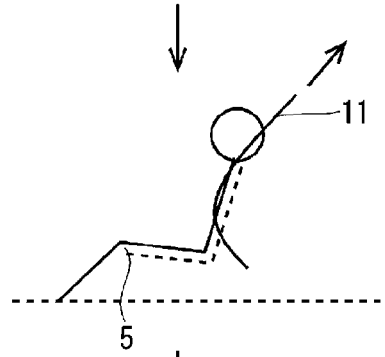

Subsequently, for example, when a collision is predicted, the pre-tensioner of the retractor device 15 is activated so that the strap 11 is retracted, as illustrated in FIG. 3B. Thus, the occupant's body may be pressed against and restrained to the seat 5. Moreover, the retractor device 15 retains the strap 11 so that the strap 11 is not unreeled with a predetermined torque or lower.

Figure 3C:
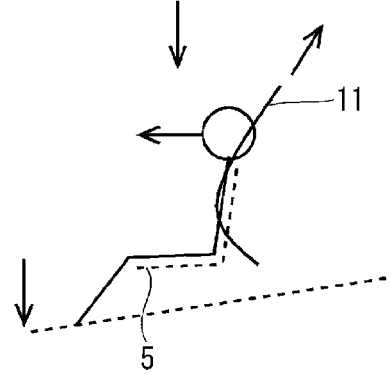

Furthermore, for example, when there is a braking operation performed during the pre-tension operation, the front of the vehicle body of the automobile 1 sinks down, as illustrated in FIG. 3C.

Figure 3D:
Figure 3D:
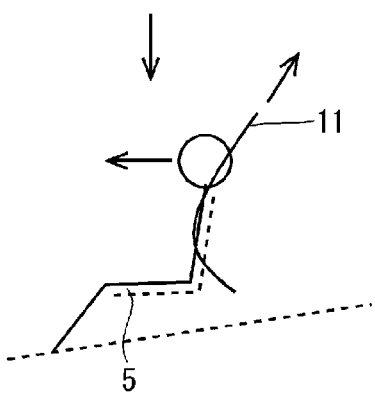

Then, for example, when the vehicle body actually bumps into the rear of another automobile 1 in FIG. 1, the body of the occupant sitting on the seat 5 tends to relatively move forward from the seat 5, as illustrated in FIG. 3D.

Accordingly, the pre-tension operation performed prior to a collision causes the back surface of the occupant sitting on the seat 5 to be pressed against the backrest of the seat 5 prior to the collision or at the time of the collision. When the occupant moves forward due to the collision, the posture of the occupant can be corrected. An impact load occurring at the time of the collision is readily applied to the occupant properly restrained by the strap 11, so that occupant protection performance can be achieved at the time of the collision.

However, in such an existing pre-tension mechanism, the pre-tension operation for retracting the strap 11 commences prior to the collision or at the time of the collision, and the collision occurs in that state. Therefore, if the front of the vehicle sinks down due to, for example, a braking operation performed during the pre-tension operation, an area where the strap 11 comes into contact with the occupant's body, such as the chest, receives a load occurring due to a change in the orientation of the vehicle in addition to a constraining pressure caused by the pre-tension operation for correcting the posture. In addition, when the collision subsequently occurs, an impact load occurring due to the collision is also applied. There is a high possibility that these three kinds of forces are added together and be applied to the contact area.

In this implementation, the occupant protection performance is enhanced by reducing the force acting on the area where the strap 11 comes into contact with the occupant's body.

Figure 4:
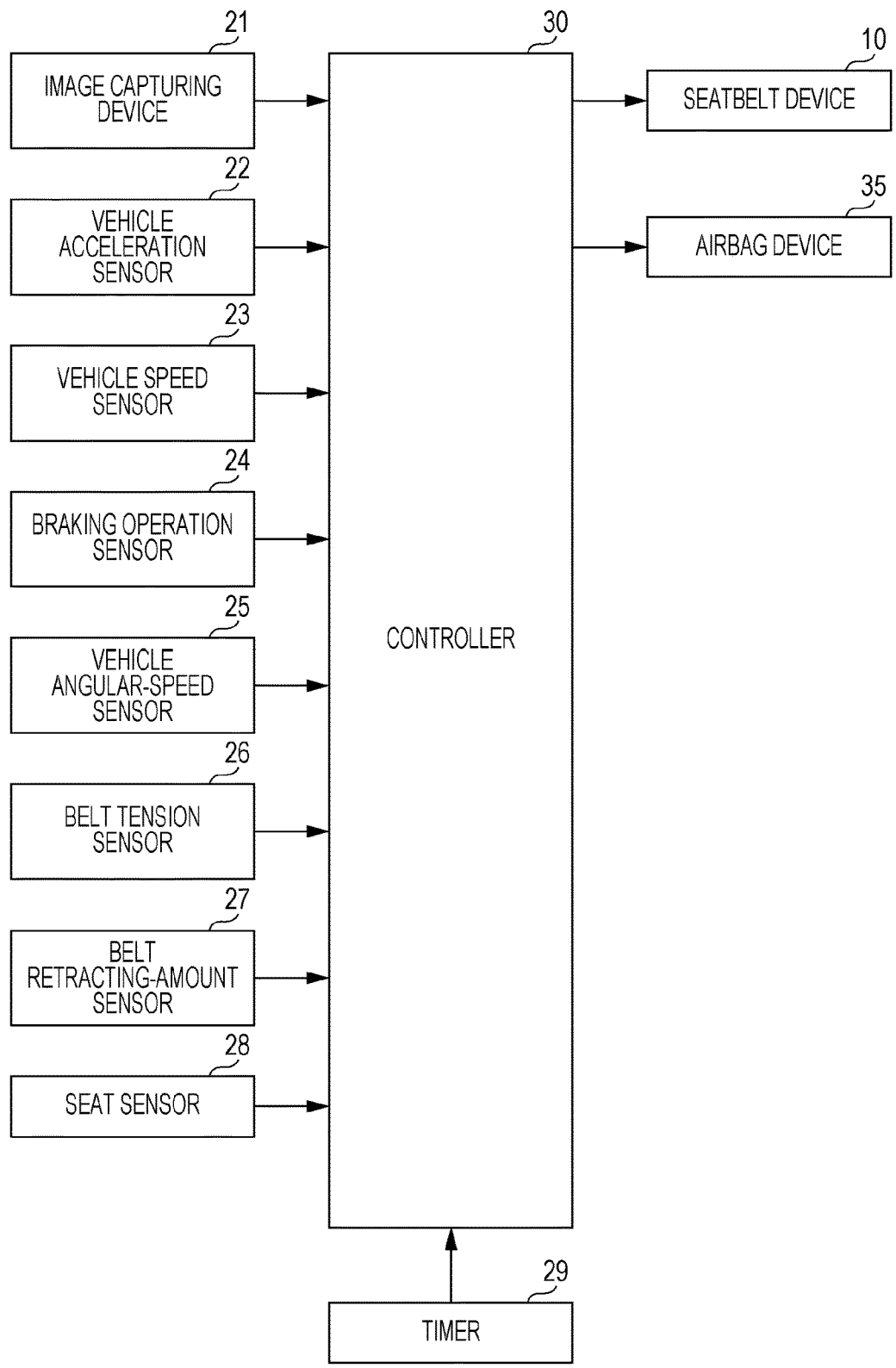
FIG. 4 is a block diagram of a control system of the occupant protection apparatus in FIGS. 2A and 2B.

FIG. 4 is a block diagram of a control system of the occupant protection apparatus in FIGS. 2A and 2B.

The control system in FIG. 4 has an image capturing device 21, a vehicle acceleration sensor 22, a vehicle speed sensor 23, a braking operation sensor 24, a vehicle angular-speed sensor 25, a belt tension sensor 26, a belt retracting-amount sensor 27, a seat sensor 28, a timer 29, and a controller 30 coupled to these devices. Furthermore, the seatbelt device 10 and an airbag device 35 that are coupled to and are controlled by the controller 30 are also illustrated in FIG. 4.

The image capturing device 21 is, for example, a pair of image capturing elements provided facing forward at the roof of the occupant compartment 3, as illustrated in FIG. 1, and observes the peripheral conditions ahead of the vehicle by imaging. The controller 30 may specify an obstacle, such as another automobile 1 ahead of the vehicle, as a peripheral condition of the vehicle from the captured image and determine the possibility of a collision with the obstacle. Thus, the running condition of the vehicle prior to a collision can be detected.

The vehicle acceleration sensor 22 is fixed to the vehicle body and detects the acceleration of the vehicle, as a running condition of the vehicle, based on acceleration and deceleration. Thus, a change in the orientation of the vehicle prior to a collision can be detected. Since large deceleration occurs in the event of a collision, a collision of the vehicle can be detected.

The vehicle speed sensor 23 is fixed to the vehicle body and detects the vehicle speed as a running condition of the vehicle.

The braking operation sensor 24 is provided within the occupant compartment 3 and detects whether the brake pedal is pressed by the occupant. Thus, an operation for changing the orientation of the vehicle prior to a collision can be detected.

The vehicle angular-speed sensor 25 is fixed to either one of the front and the rear of the vehicle and detects, for example, a vertical angular speed of the vehicle as a running condition of the vehicle. Thus, a change in the orientation of the vehicle prior to a collision can be detected.

The belt tension sensor 26 is provided in, for example, the retractor device 15 and detects tension applied to the strap 11. Thus, either one of relatively forward movement of the occupant's body during deceleration and tension applied to the strap 11 due to the movement of the body can be detected. Consequently, the belt tension sensor 26 may function as a belt sensor that detects a change in the orientation of the vehicle prior to a collision.

The belt retracting-amount sensor 27 is provided in, for example, the retractor device 15 and detects the retracting amount of the strap 11. Consequently, the belt retracting-amount sensor 27 may function as a belt sensor that detects a change in the orientation of the vehicle prior to a collision.

The seat sensor 28 is provided at, for example, the seat surface of the seat 5 and detects whether or not an occupant is sitting on the seat 5, as well as the seat pressure and the seated position. In the event of a collision, the occupant's body tends to move forward. Thus, a change in the orientation of the vehicle prior to a collision can be detected.

The timer 29 measures time.

Based on detection signals from these sensors, the controller 30 controls the occupant protection operation performed by the seatbelt device 10. For example, the controller 30 performs pre-collision control for causing the pre-tensioner to retract the strap 11 based on a collision prediction and performs collision control based on detection of a collision.

Figure 5:
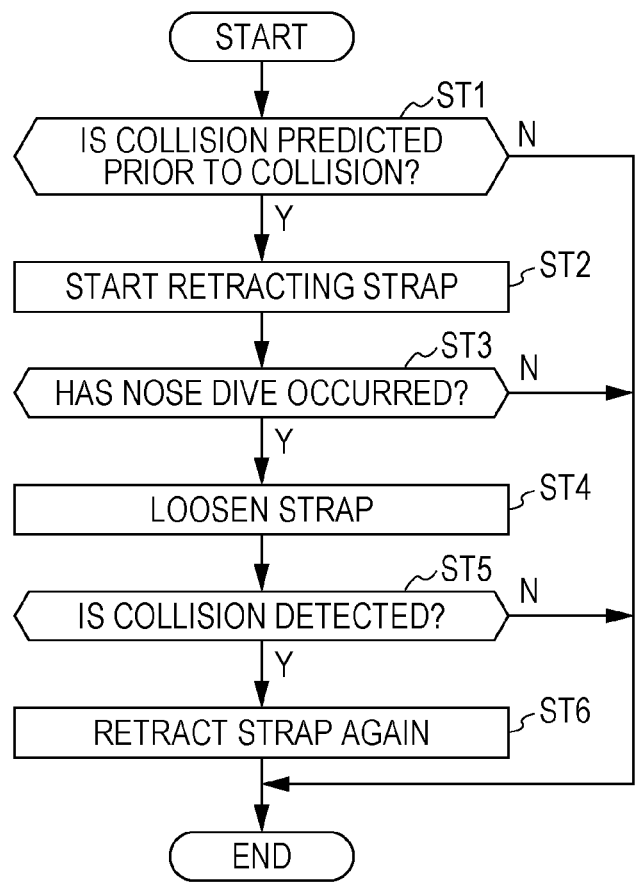
FIG. 5 is a flowchart of occupant protection control performed by a controller in FIG. 4.

FIG. 5 is a flowchart of occupant protection control performed by the controller 30 in FIG. 4. The controller 30 repeatedly executes the process in FIG. 5 so as to control the retracting of the strap 11 by the pre-tensioner.

FIGS. 6A to 6D illustrate an example of the occupant protection operation based on the control in FIG. 5. Specifically, time flows sequentially from FIG. 6A to FIG. 6D in that order. The automobile 1 collides with another automobile 1 at the timing illustrated in FIG. 6D.

As illustrated in FIG. 5, the controller 30 periodically determines whether there is a possibility of a collision (step ST1). The controller 30 may determine whether there is a possibility of a collision that is not easily avoidable.

For example, the controller 30 specifies an obstacle, such as another automobile 1 ahead of the vehicle, from a vehicle front image captured by the image capturing device 21. If an obstacle is specified, the controller 30 determines that there is a possibility of a collision. If there is a possibility of a collision, the time period until the collision occurs is predicted. For example, the appearance of an obstacle located nearby varies between images captured by the pair of image capturing elements arranged in the vehicle width direction. Therefore, based on the difference in the appearance of the obstacle between the pair of images, the obstacle located nearby can be specified. Furthermore, the direction of and the distance to the obstacle can be calculated using the triangular method based on the positions of the pair of image capturing elements and the image-captured positions of the obstacle in the pair of images. Based on this distance and the vehicle speed detected by the vehicle speed sensor 23, the time it takes for the vehicle to reach the obstacle and collide therewith can be calculated. Furthermore, based on information about the directions of and the distances to a plurality of sets of obstacles before and after each other in terms of time, the controller 30 may predict the moving directions of and the distances to the obstacles and predict a collision with each obstacle based on the prediction result.

As another alternative, for example, the controller 30 may determine that there is a possibility of a collision based on rapid deceleration of the vehicle for avoiding the collision, which is detected by the vehicle acceleration sensor 22, and a rapid deceleration operation for avoiding the collision, which is detected by the braking operation sensor 24.

Figure 6A:
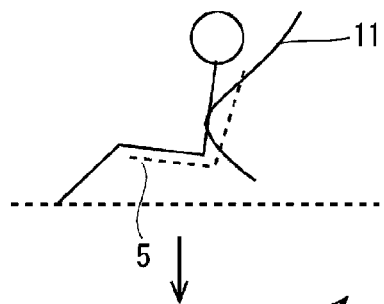
FIGS. 6A to 6D illustrate an example of the occupant protection operation based on the control in FIG. 5.

When a possibility of a collision is predicted, the controller 30 causes the pre-tensioner to start retracting the strap 11 (step ST2). In this case, the controller 30 may drive the motor 18 in the retracting direction. Consequently, the retracting of the strap 11 extending across the front of the occupant's body commences prior to a collision. The occupant's body is retrained by the strap 11 and is pressed against the seat 5. The occupant's body is corrected to a proper posture in which the occupant's back is in contact with the seat 5. For example, the occupant's upper body shifted forward away from the seat 5, as in FIG. 6A, is restrained by the strap 11 so as to be pressed against the seat 5 prior to a collision, as in FIG. 6B.

In contrast, if a possibility of a collision is not predicted, the controller 30 ends the process in FIG. 5.

After the pre-tensioner starts retracting the strap 11, the controller 30 starts detecting a change in the orientation of the vehicle, such as a nose dive (step ST3).

Then, if sinking of the front of the vehicle is detected, the retracting of the strap 11 is temporarily stopped or eased (step ST4).

Figure 6B:
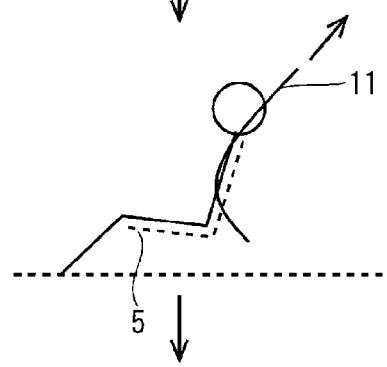
Figure 6C:
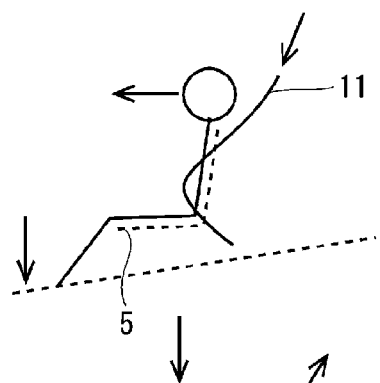
Figure 6D:
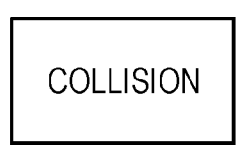
Figure 6D:
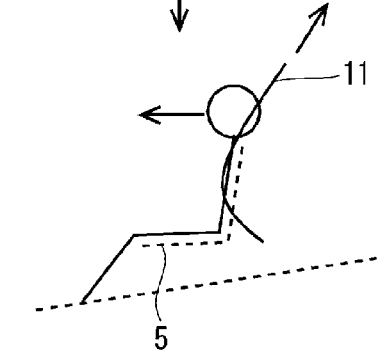

In this case, the controller 30 may cause the motor 18 to reduce the retraction torque or cause the motor 18 to reversely rotate in the feeding direction. Thus, when the occupant's body moves forward due to an impact at the time of a collision, the retracting of the strap 11 can be temporarily eased. The occupant's upper body pressed against and restrained to the seat 5 prior to a collision, as in FIG. 6B, moves forward due to a nose dive, as in FIG. 6C. In FIG. 6C, this forward movement of the upper body causes the strap 11 to be pulled out. Specifically, stress applied by the strap 11 to constrict the upper body for correcting the posture of the occupant is reduced by temporarily easing the retracting of the strap 11 when a collision occurs.

After temporarily easing the retracting of the strap 11, the controller 30 detects a collision (step ST5). In detail, for example, detection by an impact sensor, such as either one of the vehicle acceleration sensor 22 and the belt tension sensor 26, is monitored. If the vehicle acceleration sensor 22 detects high acceleration at the time of a collision or if the belt tension sensor 26 detects high tension at the time of a collision, the controller 30 determines that a collision has occurred.

Then, when the collision is detected, the controller 30 retracts the strap 11 again (step ST6). In this case, the controller 30 may drive the motor 18 with the retraction torque used prior to the loosening of the strap 11. Consequently, the body that has moved forward during the collision in FIG. 6C after the correction in FIG. 6B is properly pressed against and restrained to the seat 5, as in FIG. 6D.

Accordingly, in this implementation, the pre-tensioner starts retracting the strap 11 prior to a collision or when a collision occurs. With the pre-tension operation, the occupant's body can be properly supported.

In addition, in this implementation, after commencing the retracting of the strap 11, the retracting of the strap 11 is temporarily stopped or eased in accordance with a change in the orientation of the vehicle. Thus, even if the pre-tension operation causes a constraining pressure to be applied to the area where the strap 11 comes into contact with the occupant, the constraining pressure can be reset and reduced. The constraining pressure caused by the pre-tension operation and the load occurring due to a change in the orientation of the vehicle are unlikely to be added together and be applied directly to the contact area with the strap 11. In addition, even if an impact load is subsequently applied due to a collision, these three kinds of forces are unlikely to be added together and be applied directly to the contact area.

Furthermore, in this implementation, when the retracting of the strap 11 commences, a vehicle orientation sensor starts to detect sinking of the front of the vehicle. Therefore, with the vehicle orientation sensor, a nose dive in which the front of the vehicle sinks down does not have to be constantly detected.

Furthermore, in this implementation, after the pre-tension operation is stopped or interrupted, the strap 11 is retracted again. Thus, the occupant's body that has moved forward due to a nose dive from a posture corrected as a result of the pre-tension operation performed prior to a collision can be supported by the strap 11. In addition, when a nose dive occurs, the constraining pressure caused by the pre-tension operation performed prior to a collision and the load pressure caused by the nose dive are reduced in advance, so that an impact load occurring at the time of a collision is unlikely to be added directly to these kinds of pressures and be applied to the occupant's body. The pressure applied to the occupant's body when a collision involving a nose dive occurs can be effectively reduced.

Second Implementation

A second implementation of the present invention differs from the first implementation in terms of the occupant protection control. The following description will mainly be focused on the differences from the first implementation, and the description of the configuration and operation similar to those in the first implementation will be omitted.

Figure 7:
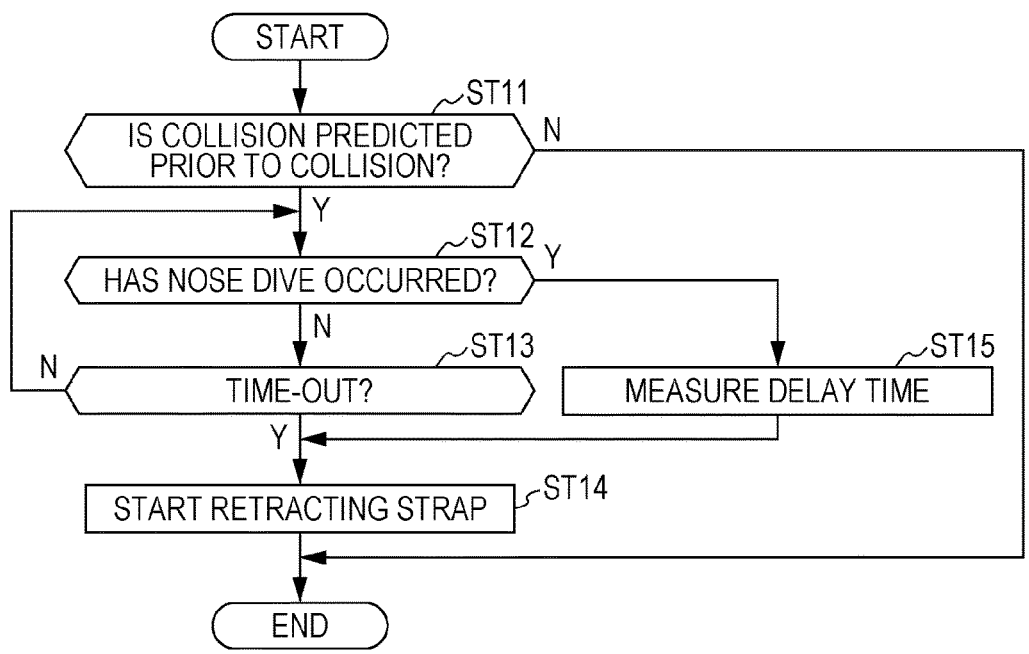
FIG. 7 is a flowchart of occupant protection control according to a second implementation.

FIG. 7 is a flowchart of occupant protection control according to the second implementation.

As illustrated in FIG. 7, the controller 30 periodically determines whether there is a possibility of a collision (step ST11). The controller 30 may determine whether there is a possibility of a collision that is not easily avoidable.

When a possibility of a collision is predicted, the controller 30 starts detecting a change in the orientation of the vehicle, such as a nose dive (step ST12). The controller 30 continues to detect a change in the orientation of the vehicle until the timer 29 measures a predetermined time period that is shorter than an expected time period until a collision occurs (step ST13).

Then, if a nose dive is not detected before the timer 29 measures the predetermined time period that is shorter than the expected time period until a collision occurs, the controller 30 causes the pre-tensioner to start retracting the strap 11 (step ST14).

If a nose dive is detected before the timer 29 measures the predetermined time period, the controller 30 causes the timer 29 to measure a delay time period (step ST15) and subsequently causes the pre-tensioner to start retracting the strap 11 (step ST14).

Accordingly, in this implementation, if a nose dive occurs when a possibility of a collision is detected, the pre-tension operation does not commence at that timing but commences after a delay. Thus, the occupant leaning forward due to the nose dive can be prevented from being constricted by the strap 11.

The invention claimed is:

1. A vehicle occupant protection apparatus, comprising:
   a strap configured to extend across a front of a body of an occupant sitting on a seat of a vehicle;
   a pre-tensioner configured to retract the strap;
   a vehicle orientation sensor configured to detect at least one of a change in an orientation of the vehicle and an operation for changing the orientation of the vehicle: and
   a controller configured to cause the pre-tensioner to start retracting the strap prior to a collision or when the collision occurs,
   wherein, when the vehicle orientation sensor detects the change in the orientation of the vehicle after the retracting of the strap starts, the controller temporarily stops or eases the retracting of the strap and, when the collision is detected, the controller retracts the strap again after the controller temporarily stops or eases the retracting of the strap.

2. The vehicle occupant protection apparatus according to claim 1, wherein, in a case where sinking of a front of the vehicle is detected by the vehicle orientation sensor, the controller temporarily stops or eases the retracting of the strap.

3. The vehicle occupant protection apparatus according to claim 2, further comprising:
   a running condition sensor configured to detect a running condition of the vehicle,
   wherein, in a case where a possibility of the collision is present on a basis of the running condition detected by the running condition sensor, the controller causes the pre-tensioner to start retracting the strap prior to the collision and causes the vehicle orientation sensor to start detecting the sinking of the front of the vehicle.

4. The vehicle occupant protection apparatus according to claim 3, wherein the vehicle orientation sensor comprises at least one of a vehicle deceleration sensor, a seat sensor, a vehicle angular-speed sensor provided at either one of a front and a rear of the vehicle, and a belt sensor provided at the strap, the vehicle deceleration sensor being configured to detect one of a deceleration of the vehicle or the occupant and a decelerating operation.

5. The vehicle occupant protection apparatus according to claim 4, wherein the controller feeds the strap in control for temporarily easing the retracting of the strap.

6. The vehicle occupant protection apparatus according to claim 3, wherein the controller feeds the strap in control for temporarily easing the retracting of the strap.

7. The vehicle occupant protection apparatus according to claim 2, further comprising:
   a running condition sensor configured to detect a running condition of the vehicle,
   wherein, in a case where a possibility of a collision is present on a basis of the running condition detected by the running condition sensor and the sinking of the front of the vehicle is not detected on a basis of the vehicle orientation sensor, the controller causes the pre-tensioner to start retracting the strap, and
   wherein, in a case where a possibility of a collision is present on the basis of the running condition detected by the running condition sensor and the sinking of the front of the vehicle is detected on the basis of the vehicle orientation sensor, the controller does not cause the pre-tensioner to start retracting the strap and subsequently causes the pre-tensioner to start retracting the strap after a delay.

8. The vehicle occupant protection apparatus according to claim 7, wherein the vehicle orientation sensor comprises at least one of a vehicle deceleration sensor, a seat sensor, a vehicle angular-speed sensor provided at either one of a front and a rear of the vehicle, and a belt sensor provided at the strap, the vehicle deceleration sensor being configured to detect one of a deceleration of the vehicle or the occupant and a decelerating operation.

9. The vehicle occupant protection apparatus according to claim 8, wherein the controller feeds the strap in control for temporarily easing the retracting of the strap.

10. The vehicle occupant protection apparatus according to claim 7, wherein the controller feeds the strap in control for temporarily easing the retracting of the strap.

11. The vehicle occupant protection apparatus according to claim 2, wherein the vehicle orientation sensor comprises at least one of a vehicle deceleration sensor, a seat sensor, a vehicle angular-speed sensor provided at either one of a front and a rear of the vehicle, and a belt sensor provided at the strap, the vehicle deceleration sensor being configured to detect one of a deceleration of the vehicle or the occupant and a decelerating operation.

12. The vehicle occupant protection apparatus according to claim 11, wherein the controller feeds the strap in control for temporarily easing the retracting of the strap.

13. The vehicle occupant protection apparatus according to claim 2, wherein the controller feeds the strap in control for temporarily easing the retracting of the strap.

14. The vehicle occupant protection apparatus according to claim 1, wherein the vehicle orientation sensor comprises at least one of a vehicle deceleration sensor, a seat sensor, a vehicle angular-speed sensor provided at either one of a front and a rear of the vehicle, and a belt sensor provided at the strap, the vehicle deceleration sensor being configured to detect one of a deceleration of the vehicle or the occupant and a decelerating operation.

15. The vehicle occupant protection apparatus according to claim 14, wherein the controller feeds the strap in control for temporarily easing the retracting of the strap.

16. The vehicle occupant protection apparatus according to claim 1, wherein the controller feeds the strap in control for temporarily easing the retracting of the strap.

17. The vehicle occupant protection apparatus according to claim 1, wherein the vehicle orientation sensor comprises a seat sensor provided at a surface of the seat of the vehicle to detect whether the occupant is sitting on the seat, a seat pressure, and a seated position of the occupant to detect the change in the orientation of the vehicle prior to the collision.

\* \* \* \* \*